United States Patent
Koster et al.

(10) Patent No.: US 9,961,169 B1
(45) Date of Patent: May 1, 2018

(54) IMPLEMENTING AUTOSWITCHING NETWORK PROTOCOLS FOR OPTIMAL EFFICIENCY

(71) Applicant: International Business Machines Corporation, Armonk, NY (US)

(72) Inventors: David M. Koster, Rochester, MN (US); Jason A. Nikolai, Rochester, MN (US); Adam D. Reznechek, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/339,145

(22) Filed: Oct. 31, 2016

(51) Int. Cl.
*G06F 15/16* (2006.01)
*H04L 29/06* (2006.01)
*H04L 12/801* (2013.01)
*H04L 12/26* (2006.01)

(52) U.S. Cl.
CPC ............. *H04L 69/18* (2013.01); *H04L 43/04* (2013.01); *H04L 43/0835* (2013.01); *H04L 47/127* (2013.01); *H04L 65/608* (2013.01); *H04L 69/165* (2013.01)

(58) Field of Classification Search
CPC ...... H04L 69/18; H04L 43/04; H04L 43/0835
USPC ........................................................ 709/224
See application file for complete search history.

(56) References Cited

U.S. PATENT DOCUMENTS

| | | | |
|---|---|---|---|
| 2005/0182847 A1 | 8/2005 | Pirzada et al. | |
| 2011/0222539 A1 | 9/2011 | Grosser et al. | |
| 2014/0306833 A1* | 10/2014 | Ricci | B60Q 1/00 340/901 |
| 2015/0256654 A1* | 9/2015 | Oguchi | H04L 69/08 709/230 |
| 2015/0295982 A1* | 10/2015 | Kafle | H04L 65/1083 709/219 |
| 2016/0198021 A1* | 7/2016 | Mooney | H04L 69/24 370/467 |
| 2016/0337430 A1* | 11/2016 | Lou | H04L 65/607 |

OTHER PUBLICATIONS

Anonymously; "Metric for Routing Algorithms based on Big Data Analytics"; http://ip.com/IPCOM/000243433D; Sep. 21, 2015.
Anonymously; "Determining an Initial Size of a Congestion Window based on Characteristics of a Network Path"; http://ip.com/IPCOM/000237042D; May 28, 2014.
Martinez, R. et al.; "GMPLS/PCE—controlled multi-flow optical transpondes in elastic optical networks [Invited]"; IEEE/OSA Journal of Optical Communications and Networking, vol. 7, No. 11, pp. B71-B80, Nov. 2015.
Chromium Blog, "A QUIC update on Google's expperimental transport", Apr. 17, 2015 http://blog.chromium.org/2015/04/a-quic-update-on-googles-experimental.html.

* cited by examiner

*Primary Examiner* — Bryan Lee
(74) *Attorney, Agent, or Firm* — Joan Pennington

(57) ABSTRACT

A method, and a system are provided for implementing dynamic switching of network protocols for optimal performance for data being transmitted between nodes. An appropriate transport protocol between nodes is dynamically chosen based upon monitored system and network metrics.

20 Claims, 5 Drawing Sheets

IMPLEMENTING AUTOSWITCHING NETWORK PROTOCOLS FOR OPTIMAL EFFICIENCY

FIELD OF THE INVENTION

The present invention relates generally to the data processing field, and more particularly, relates to a method and computer system for implementing dynamic switching of network protocols for optimal performance for data being transmitted between nodes.

DESCRIPTION OF THE RELATED ART

Distributed computing applications, such as IBM Streams, requires fast data pipes over a network to process data in real time. Transmission Control Protocol (TCP) is an excellent internet protocol for ensuring that packets are delivered, but can reduce the speed at which the data is transmitted between nodes. User Datagram Protocol (UDP) is an excellent protocol for speed, for example, for video data where a few lost packets does not make a significant difference. QUIC (Quick UDP Internet Connection) is a new protocol which further reduces latency, for example, as compared to that of TCP, and UDP.

A need exists for an effective mechanism to improve communication between nodes by intelligently selecting an appropriate transport protocol between nodes.

SUMMARY OF THE INVENTION

Principal aspects of the present invention are to provide a method, and a system for implementing dynamic switching of network protocols for optimal performance for data being transmitted between nodes. Other important aspects of the present invention are to provide such method, and system substantially without negative effects and that overcome some of the disadvantages of prior art arrangements.

In brief, a method, and a system are provided for implementing dynamic switching of network protocols for optimal performance for data being transmitted between nodes. An appropriate transport protocol between nodes is dynamically chosen based upon monitored system and network metrics.

In accordance with features of the invention, learned intelligent protocol switching for optimal performance is provided based upon monitored system and network metrics, such as network quality, historical network data, and previous node data.

In accordance with features of the invention, learned application patterns and at least one threshold are used for protocol switchover.

In accordance with features of the invention, the thresholds are set for protocol switch over via API/Library Call.

In accordance with features of the invention, historical trend analysis of connections and system data are applied to real time protocol determination.

In accordance with features of the invention, the ability is provided to predict which protocol is best to apply on network segments, switches, and between systems.

In accordance with features of the invention, guaranteed delivery with UDP is provided using a buffer and switching to TCP when data loss begins to occur.

In accordance with features of the invention, protocol is automatically selected based on the size of data being selected for optimal performance In accordance with features of the invention, protocol is automatically selected based on historical and expected congestion metrics.

In accordance with features of the invention, protocol is automatically selected based on a number independent data streams from source to sink.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, and a system are provided for implementing dynamic switching of network protocols for optimal performance for data being transmitted between nodes. An appropriate transport protocol between nodes is dynamically chosen based upon monitored system and network metrics.

Figure 1:
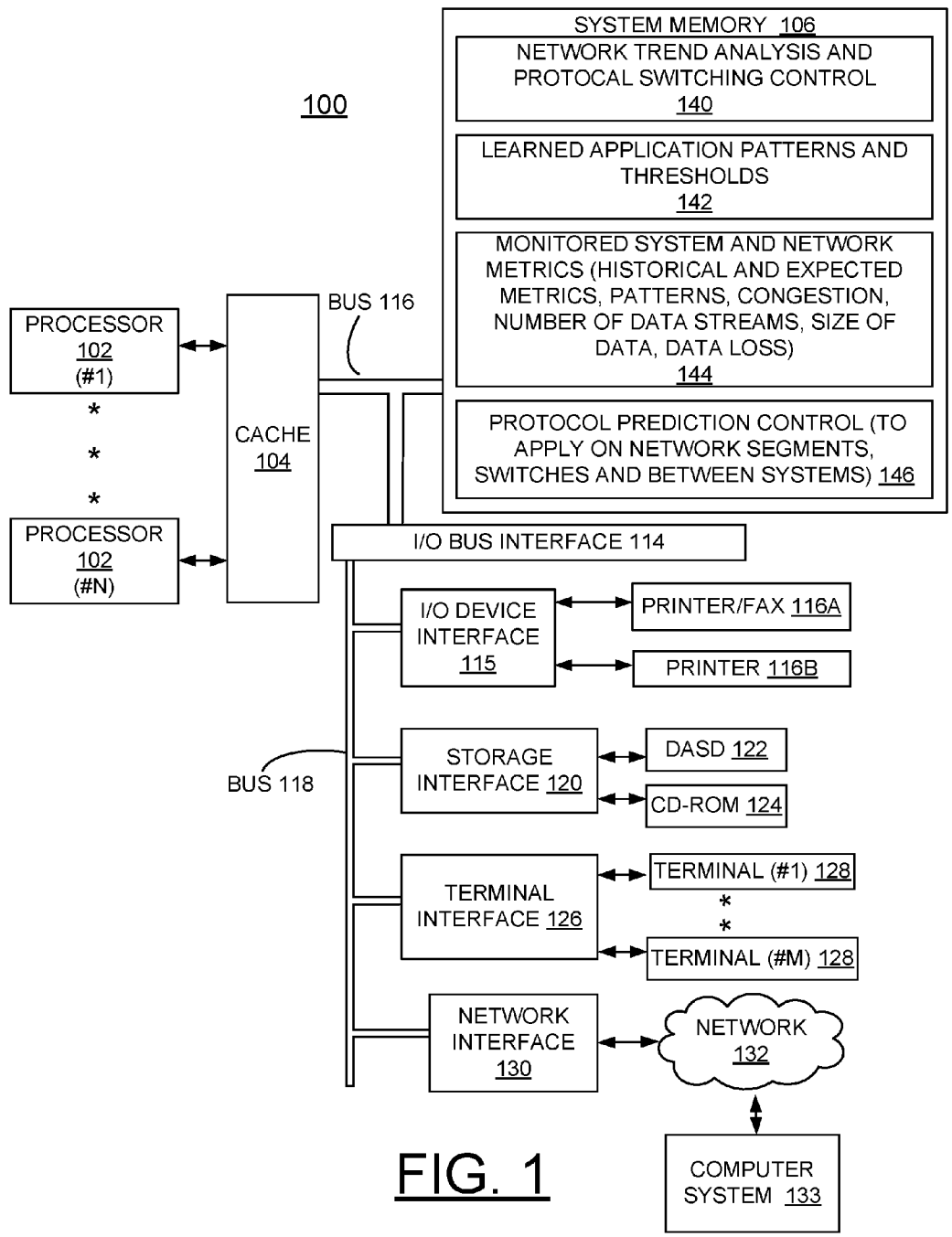
FIG. 1 illustrates an example computer system for implementing dynamic switching of network protocols for optimal performance for data being transmitted between nodes in accordance with preferred embodiments.

Having reference now to the drawings, in FIG. 1, there is shown an example computer system generally designated by the reference character 100 for implementing dynamic switching of network protocols for optimal performance for data being transmitted between nodes in accordance with preferred embodiments. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 connected to bus 116. Memory system 106 includes a random-access semiconductor memory for storing data, including programs. Memory system 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes an I/O device interface 115 coupled to I/O devices, such as a first printer/fax 116A, and a second printer 116B, a storage interface 120 coupled to storage devices, such as, a direct access storage device (DASD) 122, and a CD-ROM 124. Computer system 100 includes a terminal interface 126 coupled to a plurality of terminals 128, #1-M, and a network interface 130 coupled to a network 132, such as the Internet, local area or other networks. Network 132 is coupled to one or more computer systems 133.

I/O bus interface 114 communicates with multiple I/O interface units 114, 120, 126, and 130, which are also known as I/O processors (IOPs) or I/O adapters (IOAs), through system I/O bus 116. System I/O bus 116 is, for example, an industry standard PCI bus, or other appropriate bus technology.

Memory system 106 includes a network trend analysis and protocol switching control 140 in accordance with preferred embodiments. Memory system 106 stores learned application patterns and thresholds 142, and monitored system and network metrics 144 including historical and expected congestion metrics, a number of data streams, size of data, data loss, and the like in accordance with preferred embodiments. Memory system 106 includes protocol prediction control 146, for example, to apply on network segments, switches and between systems in accordance with preferred embodiments.

In accordance with features of the invention, learned intelligent protocol switching for optimal performance is provided based upon monitored system and network metrics 144, such as network quality, historical network data, and previous node data. Learned application patterns and at least one threshold are used for protocol switchover. The thresholds optionally are set for protocol switchover via API/Library Call. Historical trend analysis of connections and system data are applied to real time protocol determination.

In accordance with features of the invention, the ability is provided to predict which protocol is best to apply on network segments, switches, and between systems. Protocol is automatically selected based on historical and expected congestion metrics. Protocol is automatically selected based on the size of data being selected for optimal performance.

Computer system 100 is shown in simplified form sufficient for understanding the present invention. The illustrated computer system 100 is not intended to imply architectural or functional limitations. Although main memory 110 of main memory system 106 is represented conceptually in FIG. 1 as a single entity, it will be understood that in fact the main memory is more complex. For example, main memory system 106 comprises multiple modules and components. The present invention can be used with various hardware implementations and systems and various other internal hardware devices.

Figure 2:
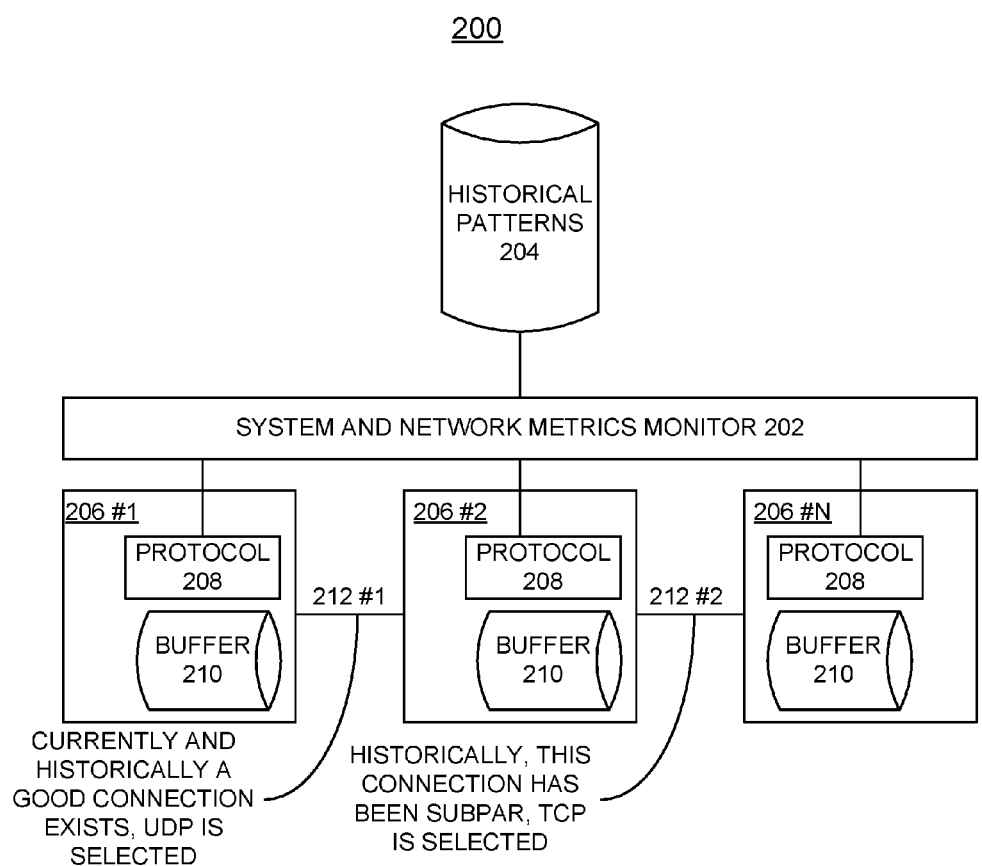
FIG. 2 illustrates an example operational functions for dynamic switching of network protocols for optimal performance for data being transmitted between nodes in accordance with preferred embodiments.

Referring also to FIG. 2, there is shown an example protocol control subsystem generally designated by the reference character 200 for implementing dynamic switching of network protocols for optimal performance for data being transmitted between nodes in accordance with preferred embodiments. Protocol control subsystem 200 includes a system and network metrics monitor 202 coupled to storage 204 storing historical patterns. The system and network metrics monitor 202 monitors multiple system nodes or cloud subnets 206, #1-N. Each of the nodes 206, #1-N includes a respective protocol 208 and buffer 210. As shown, the nodes 206, #1-N are connected together by respective connections or links 212, #1-2.

In accordance with features of the invention, intelligence and historical data and metrics are incorporated into dynamic protocol switching. Various metrics 144 of the network and system stack are monitored to dynamically decide which protocol is best to use based on error rates, retransmits, historical data, quality, guarantees of data, and the like. For example, TCP is an excellent protocol for ensuring that packets are delivered. UDP is an excellent protocol for speed, for example, video data where a few lost packets do not make a significant difference.

In accordance with features of the invention, historical information and patterns are used to predict future quality data. Over time, as data is collected using TCP, under the appropriate circumstances, the network trend analysis and protocol switching control 140 automatically changes to UDP until patterns of a bad behavior are detected. At this point, the network trend analysis and protocol switching control 140 will switch back to TCP until conditions are met for fast UDP communication. To prevent data loss, buffer 210 stores data before the UDP protocol transfer which allows for replaying of the data over TCP. The programmer can force a particular protocol based on settings in the application and accepted failure rate. Perhaps one application can tolerate 4% loss while another requires 100% delivery and yet another 10% loss. Over time, the system 100 will develop defaults for applications based on behavior patterns within applications, for example, for video streams developers may typically set the switch over threshold to 5% and over time this would become the learned default for applications handling this data type.

Figure 3:
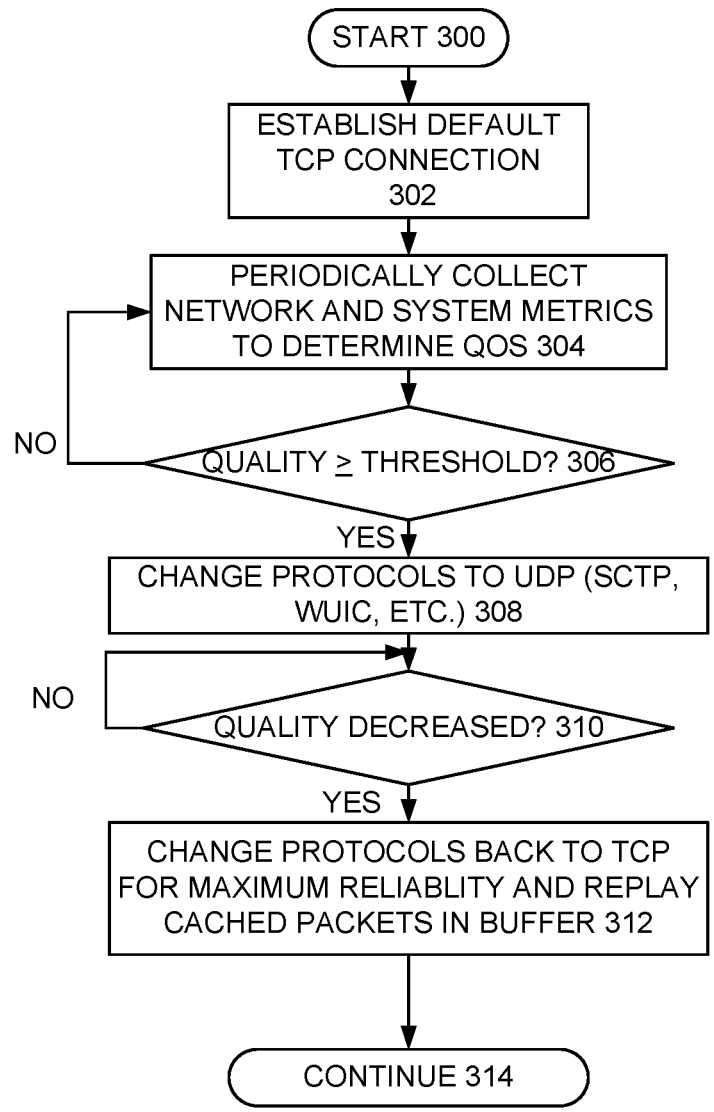
FIG. 3 is a flow chart illustrating example operations for implementing dynamic switching of network protocols for optimal performance for data being transmitted between nodes of FIGS. 1 and 2 in accordance with preferred embodiments.

Referring to FIG. 3, there are shown example operations for implementing dynamic switching of network protocols for optimal performance for data being transmitted between nodes of FIGS. 1 and 2 in accordance with preferred embodiments starting at a block 300. A default TCP connection is established as indicated at a block 302. Periodically network and system metrics are collected, for example, to determine quality of network path, congestion, system performance, Quality of Service (QOS), and the like as indicated at a block 304. As indicated at a decision block 306, after a quality threshold is reached, which can be set by application developer or system using quality expectations set by administration or learned application defaults, protocol changes to UDP, or SCTP, QUIC, or the like as indicated at a block 308. As indicated at a decision block 310, if quality decreases, protocol changes back to TCP for maximum reliability and cached packets in buffer are replayed as indicated at a block 312. Operations continue as indicated at a block 314.

Figure 4:
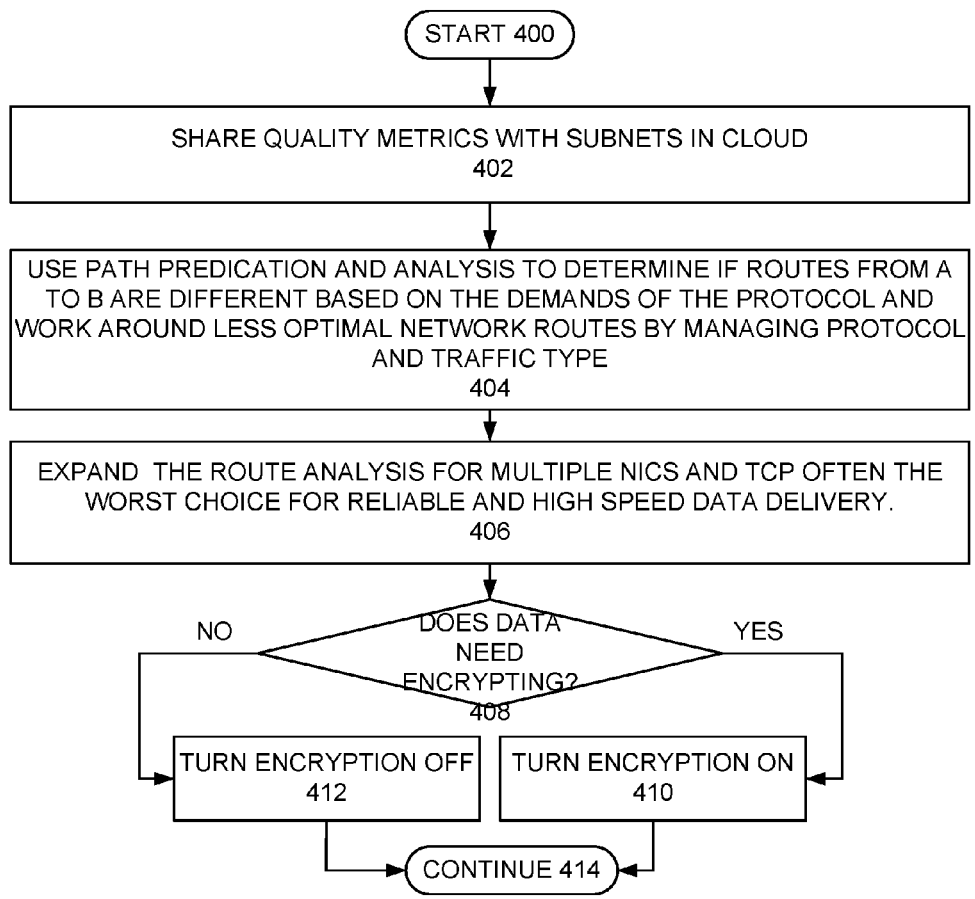
FIG. 4 is a flow chart illustrating further example operations for implementing dynamic switching of network protocols for optimal performance for data being transmitted between nodes of FIGS. 1 and 2 in accordance with preferred embodiments.

Referring to FIG. 4, there are shown further example operations for implementing dynamic switching of network protocols for optimal performance for data being transmitted between nodes of FIGS. 1 and 2 in accordance with preferred embodiments starting at a block 400. As indicated at a block 402, quality metric data is shared between subnets in the cloud making the system 100 more intelligent. As indicated at a block 404, path predication and analysis are used to determine if routes from A to B are different based on the demands of the protocol and work around less optimal network routes by managing protocol and traffic type. As indicated at a block 406, route analysis is expanded for multi-homed machines or multiple network interface cards (NICs) and TCP often the worst choice for delivering data both reliability and at high speed, managing protocol switching patterns becomes even more important here. As indicated at a decision block 408, ability to switch between Secure Socket Layer (SSL) and non-SSL or other encryption, based on the data being transferred for example, if parts are the stream may contain Health Insurance Portability and Accountability Act (HIPAA), Personally identifiable information (PII), or sensitive personal information (SPI) data, encryption would be turned on for the path of the data as indicated at a block 410, if not, it would be turned off as indicated at a block 412 for performance reasons. Operations continue as indicated at a block 414.

Figure 5:
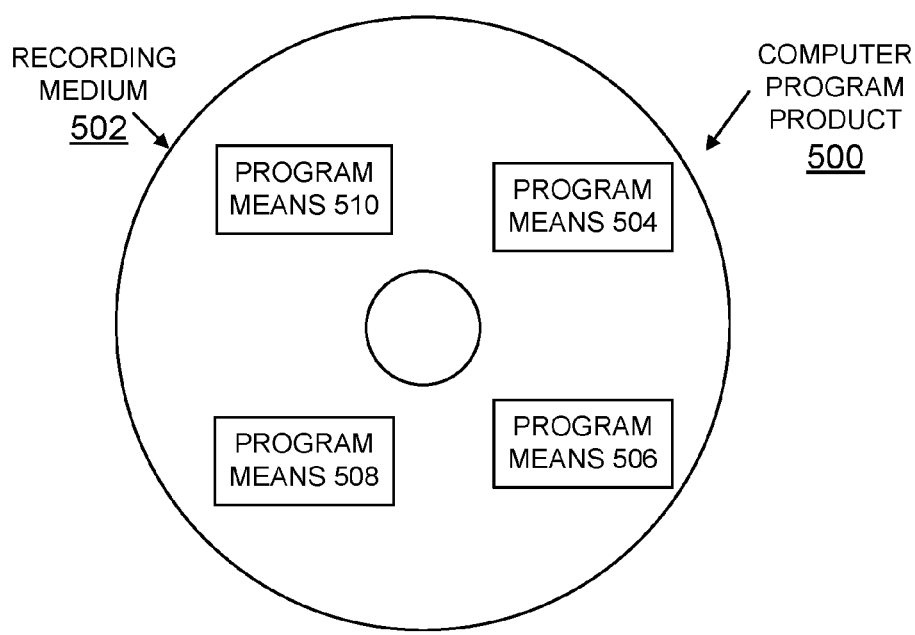
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing dynamic switching of network protocols for optimal performance in computer system 100 and subsystem 200 of FIG. 2 in accordance with preferred embodiments.

A sequence of program instructions or a logical assembly of one or more interrelated modules defined by the recorded program means 504, 506, 508, and 510, direct the memory subsystem 200 for implementing dynamic switching of network protocols for optimal performance of the preferred embodiments.

While the present invention has been described with reference to the details of the embodiments of the invention shown in the drawing, these details are not intended to limit the scope of the invention as claimed in the appended claims.

What is claimed is:

1. A computer-implemented method for implementing dynamic switching of network protocols for optimal performance for data being transmitted between nodes in a computer system including a processor and a network trend analysis and protocol switching control, said computer-implemented method comprising:

said processor using said network trend analysis and protocol switching control performs:
providing a system and network metrics monitor monitoring system and network metrics at multiple system nodes;
providing a storage coupled to said system and network metrics monitor storing historical patterns;
automatically choosing a transport protocol based upon data analysis of real time monitored system and network metrics and learned and predicted patterns for system and network metrics;
automatically and dynamically switching the transport protocol for data being transmitted between nodes responsive to automatically choosing the transport protocol; and
automatically and dynamically switching the transport protocol includes establishing a default Transmission Control Protocol (TCP) connection, periodically collecting network and system metrics to determine Quality of Service (QOS), identifying a QOS threshold reached, changing transport protocol to a selected one of a plurality of different protocols; applying the transport protocol to at least one of network segments, network switches and between systems; identifying a QOS decrease, changing back to Transmission Control Protocol (TCP), with cached packets in buffer being replayed.

2. The computer-implemented method as recited in claim 1 wherein changing transport protocol to a selected one of a plurality of different protocols includes changing transport protocol to a selected one of User Datagram Protocol (UDP), Quick UDP (QUIC), and Stream Control Transmission Protocol (SCTP) and includes performing and applying historical trend analysis of connections and system data to provide a real time protocol determination.

3. The computer-implemented method as recited in claim 1 wherein monitoring system and network metrics include monitoring network quality, historical network data, and previous node data.

4. The computer-implemented method as recited in claim 1 includes storing and using historical patterns and at least one threshold for protocol switchover.

5. The computer-implemented method as recited in claim 4 includes receiving a user application input and setting said least one threshold.

6. The computer-implemented method as recited in claim 1 includes performing learned protocol switching for optimal performance based upon the monitored system and network metrics.

7. The computer-implemented method as recited in claim 6 includes learning historical congestion patterns and predicting congestion metrics.

8. The computer-implemented method as recited in claim 1 wherein automatically choosing said transport protocol based upon monitored system and network metrics includes selecting a transport protocol to apply on network segments, switches, and between systems.

9. The computer-implemented method as recited in claim 1 wherein monitoring system and network metrics include monitoring data size being selected and a data type.

10. A computer system for implementing dynamic switching of network protocols for optimal performance for data being transmitted between computer nodes comprising:
a processor;
a network trend analysis and protocol switching control;
said processor using said network trend analysis and protocol switching control performs:
a system and network metrics monitor monitoring of system and network metrics at multiple system nodes; said system and network metrics monitor coupled to a storage storing historical patterns;
automatically choosing a transport protocol based upon data analysis of real time monitored system and network metrics and learned and predicted patterns for system and network metrics;

automatically and dynamically switching the transport protocol for data being transmitted between nodes responsive to automatically choosing the transport protocol; and automatically and dynamically switching the transport protocol includes establishing a default Transmission Control Protocol (TCP) connection, periodically collecting network and system metrics to determine Quality of Service (QOS), identifying a QOS threshold reached, changing transport protocol to a selected one of a plurality of different protocols; applying the transport protocol to at least one of network segments, network switches and between systems; identifying a QOS decrease, changing back to Transmission Control Protocol (TCP), with cached packets in buffer being replayed.

11. The computer system as recited in claim 10, includes control code stored on a computer readable medium, and wherein said processor uses said control code to implement dynamic switching of network protocols.

12. The computer system as recited in claim 10 wherein changing transport protocol to a selected one of a plurality of different protocols includes changing transport protocol to a selected one of User Datagram Protocol (UDP), Quick UDP (QUIC), and Stream Control Transmission Protocol (SCTP) and includes providing a buffer for buffering data with selected transport protocol switching.

13. The computer system as recited in claim 10 wherein monitoring of system and network metrics includes monitoring network quality, historical network data, and previous node data.

14. The computer system as recited in claim 10 wherein monitoring of system and network metrics includes performing historical trend analysis of connections and system data.

15. The computer system as recited in claim 10 wherein monitoring of system and network metrics includes monitoring a number of independent data streams between a source and sink.

16. The computer system as recited in claim 10 wherein automatically choosing said transport protocol based upon the monitored system and network metrics includes predicting an optimal transport protocol to apply on network segments, switches, and between systems.

17. The computer system as recited in claim 10 wherein monitoring of system and network metrics includes learning historical congestion patterns and predicting congestion metrics.

18. The computer system as recited in claim 10 wherein monitoring of system and network metrics includes storing historical patterns and at least one threshold used for protocol switchover.

19. The computer system as recited in claim 10 wherein monitoring of system and network metrics includes identifying data loss and switching to Transmission Control Protocol (TCP) from a User Datagram Protocol (UDP).

20. The computer system as recited in claim 19 includes using a buffer before UDP protocol transfer allowing for replaying of data over the TCP.

* * * * *